US008631002B2

(12) United States Patent
Suresh et al.

(10) Patent No.: US 8,631,002 B2
(45) Date of Patent: Jan. 14, 2014

(54) WEB-RELEVANCE BASED QUERY CLASSIFICATION

(75) Inventors: Sandeep Suresh, Bellevue, WA (US); Robert David Berg, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 245 days.

(21) Appl. No.: 12/963,944

(22) Filed: Dec. 9, 2010

(65) Prior Publication Data

US 2012/0150846 A1 Jun. 14, 2012

(51) Int. Cl.
G06F 17/30 (2006.01)

(52) U.S. Cl.
USPC ............................ 707/723; 707/738

(58) Field of Classification Search
USPC .......................... 707/679, 723, 738
See application file for complete search history.

(56) References Cited

U.S. PATENT DOCUMENTS

| | | | |
|---|---|---|---|
| 7,272,597 B2* | 9/2007 | Chowdhury et al. | 1/1 |
| 7,779,009 B2* | 8/2010 | Chowdhury et al. | 707/737 |
| 8,392,435 B1* | 3/2013 | Yamauchi | 707/749 |
| 2005/0004889 A1* | 1/2005 | Bailey et al. | 707/1 |
| 2006/0064411 A1* | 3/2006 | Gross et al. | 707/3 |
| 2006/0122979 A1* | 6/2006 | Kapur et al. | 707/3 |
| 2007/0022085 A1* | 1/2007 | Kulkarni | 707/1 |
| 2008/0091633 A1* | 4/2008 | Rappaport et al. | 706/50 |
| 2008/0147644 A1* | 6/2008 | Aridor et al. | 707/5 |
| 2008/0243838 A1* | 10/2008 | Scott et al. | 707/5 |
| 2009/0222444 A1* | 9/2009 | Chowdhury et al. | 707/5 |
| 2009/0228353 A1 | 9/2009 | Achan | |
| 2009/0240589 A1 | 9/2009 | Vora et al. | |
| 2010/0124378 A1* | 5/2010 | Das et al. | 382/225 |
| 2010/0198655 A1* | 8/2010 | Ketchum et al. | 705/10 |
| 2010/0257171 A1* | 10/2010 | Shekhawat | 707/738 |

OTHER PUBLICATIONS

Robust Classification of Rare Queries Using Web Knowledge—Published Date: Jul. 23, 2007.
Cross-Language Query Classification using Web Search for Exogenous Knowledge—Published Date: Feb. 9, 2009.
A Vertical Search Engine—Based on Domain Classifier—Published Date: 2008.
Automatic Classification of Web Queries Using Very Large Unlabeled Query Logs—Published Date: Apr. 2007.
Precomputing Search Features for Fast and Accurate Query Classification—Published Date: Feb. 4, 2010.

* cited by examiner

*Primary Examiner* — Truong Vo
*Assistant Examiner* — Sabana Rahman
(74) *Attorney, Agent, or Firm* — Shook, Hardy & Bacon L.L.P.

(57) ABSTRACT

Methods, systems, algorithms, and media are provided for query classification based upon web relevance. In embodiments, a knowledge domain is selected. A knowledge domain includes a set of seed-web domains which are classified to belong to the knowledge domain. For each seed-web domain, a filtered web search of a given query is implemented utilizing a filter associated with a particular seed-web domain to obtain a total number of filtered results for the seed-web domain. For each seed-web domain, a total number of non-filtered results are referenced. A percentage of coverage for each seed-web domain is calculated using the total number of filtered results for the seed-web domain and the total number of non-filtered results for the seed-web domain. An average percentage of coverage for the knowledge domain is calculated using the percentage of coverage for each seed-web domain.

14 Claims, 9 Drawing Sheets

| QUERY | IMDB.COM | NETFLIX.COM | MUSIC.AOL.COM | RHAPSODY.COM | EXPEDIA.COM | TRIPADVISOR.COM |
|---|---|---|---|---|---|---|
| THE INCREDIBLE HULK 302 | 21100000 | 94 | 0 | 5 | 0 | 2 |
| DARK KNIGHT 304 | 2640000 | 94 | 0 | 2 | 0 | 2 |
| STARDUST 306 | 10900000 | 99 | 1 | 10 | 4 | 184 |
| THE MATRIX 308 | 135000 | 4070 | 89 | 227 | 75 | 151 |
| LORD OF THE RINGS 310 | 1610000 | 12 | 0 | 4 | 0 | 14 |

| QUERY | IMDB.COM | NETFLIX.COM | MUSIC.AOL.COM | RHAPSODY.COM | EXPEDIA.COM | TRIPADVISOR.COM |
|---|---|---|---|---|---|---|
| THE INCREDIBLE HULK | 1*21100000 | 1.25*94 | 2*0 | 1.67*5 | 10*0 | 5*2 |
| DARK KNIGHT | 1*2640000 | 1.25*94 | 2*0 | 1.67*2 | 10*0 | 5*2 |
| STARDUST | 1*10900000 | 1.25*99 | 2*1 | 1.67*10 | 10*4 | 5*184 |
| THE MATRIX | 1*135000 | 1.25*4070 | 2*89 | 1.67*227 | 10*75 | 5*151 |
| LORD OF THE RINGS | 1*1610000 | 1.25*12 | 2*0 | 1.67*4 | 10*0 | 5*14 |

$$\text{FILTER}_1 \longrightarrow \frac{\text{\# PAGES RETURNED}}{\text{TOTAL \# PAGES OF SITE}_1} = \%c_1$$

$$\text{FILTER}_2 \longrightarrow \frac{\text{\# PAGES RETURNED}}{\text{TOTAL \# PAGES OF SITE}_2} = \%c_2$$

$$\vdots$$

$$\text{FILTER}_n \longrightarrow \frac{\text{\# PAGES RETURNED}}{\text{TOTAL \# PAGES OF SITE}_n} = \%c_n$$

WEB-RELEVANCE BASED QUERY CLASSIFICATION

BACKGROUND

In order to provide more relevant search results to a user, queries and the uniform resource locators (URLs) that are subsequently clicked upon are classified into a classification index. The queries and URLs are assigned to a particular category, which is also referred to as a knowledge domain. The knowledge domain generally defines the subject matter that a user was seeking when the query was presented to the search engine.

Most common random feed (CRF) classifiers use machine-based learning, using both negative and positive queries to train the classifiers. This process uses iteration to fill in missing gaps, and can also take several months to develop. In addition, classifiers need to be changed or updated frequently, which makes the overall process resource expensive.

SUMMARY

Embodiments of the invention are defined by the claims below. A high-level overview of various embodiments is provided to introduce a summary of the systems, methods, algorithms, and media that are further described in the detailed description section below. This summary is neither intended to identify key features or essential features of the claimed subject matter, nor is it intended to be used as an aid in isolation to determine the scope of the claimed subject matter.

Systems, methods, algorithms, and computer-readable storage media are described for query classification based upon web relevance. Existing web results can be used to classify search queries. Search application owners can subscribe their applications to one or more specific knowledge domains available. Examples of knowledge domains include, but are not limited to movies, music, travel, news, food, and health. A given user query can be classified into a specific knowledge domain, for example, based upon which search application can best fulfill the query.

Web index relevancy is leveraged with a set of benchmark web domains to classify queries for search application triggering. Existing web domains that strongly map to knowledge domains can be analyzed for a given query. Based upon the number of relevant results, it is determined if that query maps well to the web domain, and therefore corresponds to the knowledge domain.

For each knowledge domain, at least two web sites, which are also referred to as seed-web domains are selected which reflect that knowledge domain. Queries are run against the seed-web domains. Page counts are returned for each run. The page counts are compared across knowledge domains to determine which knowledge domain the query most likely relates, relative to all domains. Based on such a comparison, the queries are classified in association with a knowledge domain. Each set of classified queries per domain can be used as training data for input into a classifier.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Embodiments of the invention provide systems, methods, algorithms, and computer-readable storage media for query classification based upon web relevance. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example and not limitation, computer-readable storage media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact-disc read-only memory (CD-ROM), digital versatile discs (DVD), Blu-ray disc, holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network, such as the Internet.

In some embodiments, a computer-implemented method of determining a query classification is given. A knowledge domain is selected. A knowledge domain includes a set of seed-web domains which are classified to belong to the knowledge domain. For each seed-web domain, a filtered web search is implemented for a given query utilizing a filter associated with a particular seed-web domain to obtain a total number of filtered results for the web-seed domain. For each seed-web domain, a total number of non-filtered results is referenced. A percentage of coverage is calculated for each seed-web domain using the total number of filtered results for the web-seed domain and the total number of non-filtered results for the web-seed domain. An average percentage of coverage is computed for the knowledge domain using the percentage of coverage for each seed-web domain. One or more computer-readable storage media containing instructions embodied thereon, that when executed by a computing device, perform the above-described method of determining a query classification is also given.

In other embodiments, one or more computer-readable storage media containing computer-readable instructions for an algorithm embodied thereon that, when executed by a computing device, perform steps for determining a query classification is described. A set of reference web sites that are closely related to a knowledge domain of interest are selected. A plurality of reference queries related to the knowledge domain of interest are run against the set of reference web sites. An average percentage of coverage for each of the reference web sites is computed for the plurality of related reference queries. A set of random queries is run against the set of reference web sites. An average percentage of coverage for each of the reference web sites is computed for the set of random queries. It is determined whether the plurality of related reference queries is sufficiently related to the knowledge domain of interest.

In yet other embodiments, a computer-implemented system of query classification is described. The system contains a knowledge domain selecting component, which selects one or more knowledge domains. The system also contains a web-domain referencing component to reference one or more web domains within each respective knowledge domain. A query referencing component references a set of reference queries, and a query classification component classifies each query into an associated knowledge domain. An application component provides a classifier, which results from the query classification component.

Figure 1:
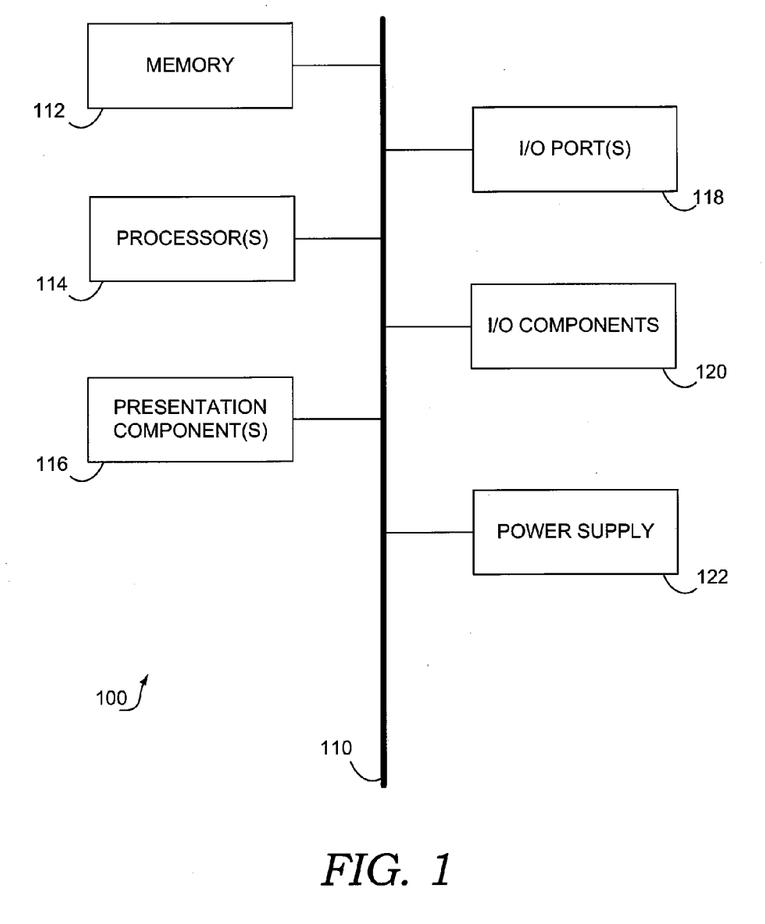
FIG. 1 is a block diagram illustrating an exemplary computer operating system used in accordance with embodiments of the invention.

Having briefly described a general overview of the embodiments herein, an exemplary computing system is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer, laptop, or server). Embodiments of the invention are also applicable to a plurality of interconnected computing devices, such as computing devices 100 (e.g., wireless phone, personal digital assistant, or other handheld devices).

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. The computing system described above is configured to be used with the several computer-implemented methods, systems, algorithms, and media for query classification based upon web relevance generally described above and described in more detail hereinafter.

One or more users may issue or input queries to a search engine server through their respective user devices and an interconnected computing network. The search engine server then returns search results to the one or more users through the interconnected computing network to the respective user devices. The computing system of FIG. 1 could be used as an exemplary system for implementing a search query and receiving results. The search engine server may store the queries issued by the one or more users and may also store the resulting documents that the users click on from the search results. This information can be stored in the form of a query click log. Entries may be organized in the query click log by the particular queries entered by the one or more users. In addition, the frequency with which users click on a document in response to a query may be recorded as well in the query click logs.

Figure 2:
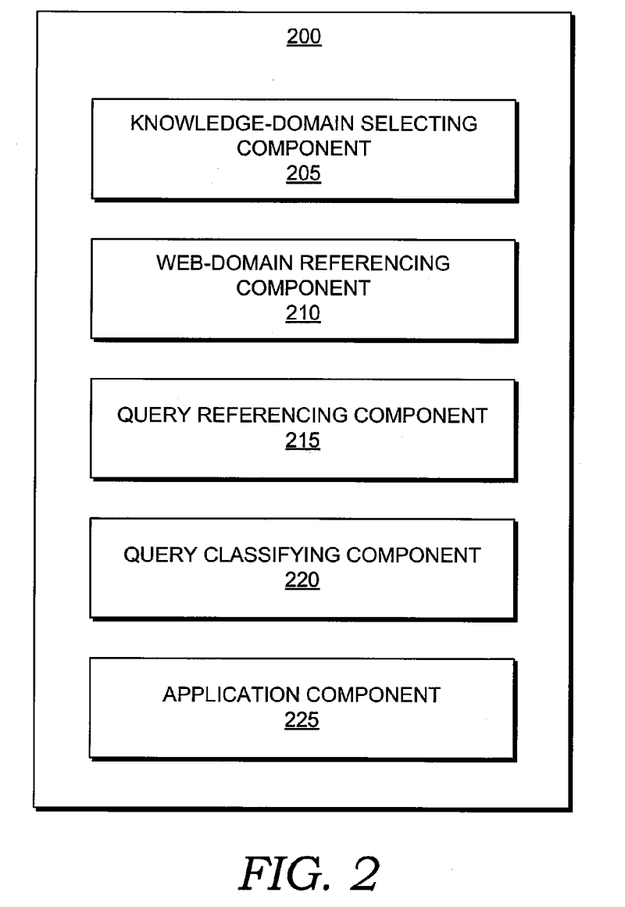
FIG. 2 is a block diagram illustrating a query classification system used in accordance with embodiments of the invention.

FIG. 2 is a block diagram illustrating a computer-implemented query classification system 200 for use in implementing embodiments of the invention. The query classification system 200 is generally configured to classify a query into a knowledge domain. In embodiments, the query classification system includes a knowledge-domain selecting component 205, a web-domain referencing component 210, a query referencing component 215, a query classification component 220, and an application component 225. Such a query classification system 200 may, for example, be integrated with or in communication with a search engine server, as described above.

The classification system 200 shown in FIG. 2 is an example of one suitable computing system and is not intended to suggest any limitation as to the scope of use or functionality of embodiments of the inventions disclosed throughout this document. Neither should the exemplary classification system 200 be interpreted as having any dependency or requirement related to any single component or combination of components illustrated therein. For example, any number of components may exist or reside within a single computing device, a set of interconnected or networked computing devices, etc.

The knowledge-domain selecting component 205 is configured to select one or more knowledge domains and/or seed web domains to use for classifying queries. A knowledge domain refers to a subject or category of related web domains (e.g., seed web domains). For example, a knowledge domain may pertain to movies, food, travel, reading, or sports, to name just a few. In an embodiment of the invention, the knowledge domain component 205 includes a comprehensive knowledge domain list. For each knowledge domain, one or more seed web domains are selected that reflect, characterize, describe, or pertain to a particular knowledge domain. As can be appreciated, any number of seed web domains can be selected for each knowledge domain.

A web domain refers to an identification of a website or webpage, such as a uniform resource locator (URL), a uniform resource identifier (URI), etc. A seed web domain refers to a web domain that is known or identified as being representative of a particular knowledge domain. By way of example only, for a "movie" knowledge domain, web domains of imdb.com, Netflix.com, and rottentomatoes.com may be selected to represent the corresponding web domain "movie." Numerous other knowledge domains and their respective seed web domains are contemplated within the scope of the invention. In one embodiment, seed web domain selection is based on an extent of relatedness to a particular web domain, a seed web domain having a sufficient or considerable number of documents in an associated web index, a seed web domain that does not overlap with multiple knowledge domains, etc. Multiple seed web domains may be selected per knowledge domain to increase precision (e.g., one web domain may not contain every entity in the corresponding knowledge domain).

The web-domain referencing component 210 is configured for referencing one or more web domains within a knowledge domain. Accordingly, web domains within a particular knowledge domain may be selected, accessed, retrieved, received, etc. In some embodiments, each web domain within a knowledge domain is referenced.

The query referencing component 215 references one or more queries. The set of reference queries could be a random set of queries or a popular set of queries, for example. Several other sets of reference queries are contemplated within embodiments of the invention. Search results from a set of reference queries can be utilized to determine the degree of linking to each of the reference seed web domains.

The query classification component 220 is used to classify one or more queries into an associated knowledge domain, such as a knowledge domain selected by knowledge-domain selecting component 205. In this regard, the query classification component 220 determines a knowledge domain to which each reference query will be classified. While various embodiments of classifying queries are contemplated, two such embodiments are described in detail below. The query classification system 200 also contains an application component 225, which provides the resultant classifier to be used with real search queries.

In one embodiment, the query classification component 220 classifies queries based on a number of documents, pages, or search results. In such an embodiment, a web-domain filtered search is conducted for a plurality of queries, for example, each of the queries in the set of queries referenced by the query referencing component 215. A web-domain filtered search or a filtered search is a search limited to a particular web domain. As an example, an amazon.com filter would return results only from the amazon.com web site. The total number of documents, pages, or search results is identified or counted for each web-domain filtered search.

A web search is implemented for a various number of filtered searches. In this regard, a web search may be performed a particular number of times, using a different seed-web domain as a filter for each web search. As an example, if the web-domain referencing component 210 references five seed-web domains, then each given query would be searched five times, using a different web domain filter for each of the five web searches. By way of example and with reference to FIG. 3, a matrix 300 of document counts for a plurality of queries is illustrated. A filtered search is performed for each query 302, 304, 306, 308, and 310 using seed-web domains 312, 314, 316, 318, 320, and 322. The document count or search results for each query-domain pair is presented within the matrix 300.

The results from the filtered search can provide an indication of confidence of a given query. In this regard, such results can be used to infer that one or more queries are most related to a particular seed-web domain(s) and thereby a particular knowledge domain associated with such seed-web domains. In embodiments, the numbers for each seed-web domain or a particular knowledge domain are compared to other seed-web domains or knowledge domains to determine confidence or relatedness of a query(s) to a knowledge domain. With continued reference to FIG. 3, assume that the seed-web domains 312 and 314 are associated with a "movie" knowledge domain. By comparing the results from the filtered search, as shown in matrix 300, it can be inferred that the queries are most related to the "movie" knowledge domain.

Figure 3:
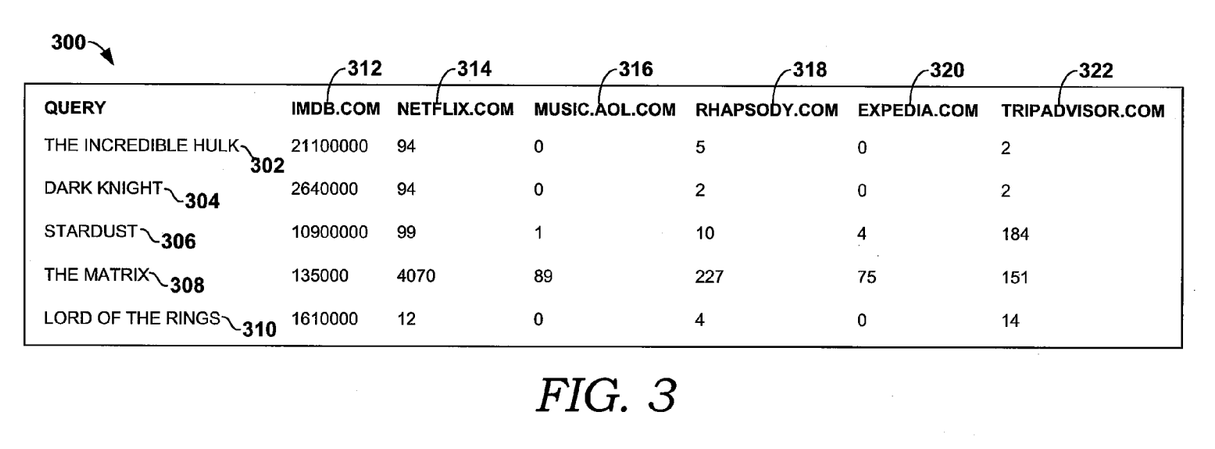
FIG. 3 is a matrix of document counts used in accordance with embodiments of the invention.

In some embodiments, such document counts or result numbers are normalized as some seed-web domains have more documents crawled than other seed-web domains. As such, the document counts for each search may be scaled, in order to make an equal comparison of different sized web domains. To normalize a particular document count, a total number of documents for a particular seed-web domain is divided into the largest total number of documents associated with any of the seed-web domains. By way of example, assume that the seed-web domain of Imdb.com has 10 million total number of documents (which is the largest number of documents for any of the applicable seed-web domains) and Netflix.com has 8 million total number of documents. In such a case, a scalar of one is calculated for the seed-web domain Imdb.com and a scalar of 1.25 is calculated for the seed-web domain Netflix.com.

Figure 4:
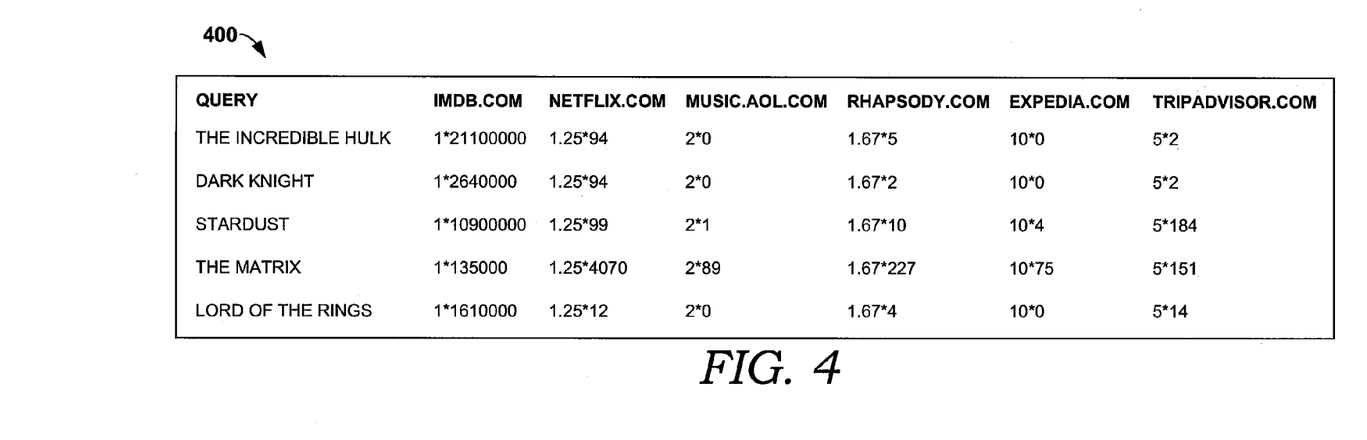
FIG. 4 is a matrix of applied document scalars used in accordance with embodiments of the invention.

To normalize the query results or the document counts for each search, the scalar is applied to the document numbers. For instance, the scalar of one is multiplied by each document count for each query-domain pair associated with the seed-web domain imdb.com. The scalar of 1.25 is multiplied by each document count for each query-domain pair associated with the seed-web domain Netflix.com. FIG. 4 shows a matrix 400 illustrating exemplary scalars being applied to the document counts for each query-domain pair.

Each individual query is classified into a reference knowledge domain associated with the highest document count (e.g., highest scaled document count). In this regard, the highest document count from the seed-web domains within a particular knowledge domain is selected. Accordingly, a total document count for a knowledge domain, including document counts for each seed-web domain within a knowledge domain, may be calculated and used to select a knowledge domain. In other embodiments, an average document count for each knowledge domain may be calculated and used to select a knowledge domain. In such an embodiment, the average document count is the average number of documents for each seed-web domain of a particular knowledge domain in association with a particular query.

Each individual knowledge domain is ranked in accordance with a total document rank, an average document count, or the like. The individual query is then classified into the highest ranking knowledge domain.

As can be appreciated, some queries have ambiguous results. For example, assume that a knowledge domain has 2 million documents and another knowledge domain has 1.9 million documents. In such a case, a percentage threshold may be used to determine ambiguity. For instance, if the second highest knowledge domain has a difference less than five percent to the highest knowledge domain, the query may be considered ambiguous and, as a result, the query may be classified into both knowledge domains. In an alternative approach, actual results from a web index for a query (e.g., not restricting it with a filtered search) may be utilized. For instance, if results are even or close between two seed-web domains or knowledge domains, web results, such as the top 20 web results, can be analyzed. For instance, the first seed-web domain listed within the search results may be used to resolve any disambiguity.

Figure 5:
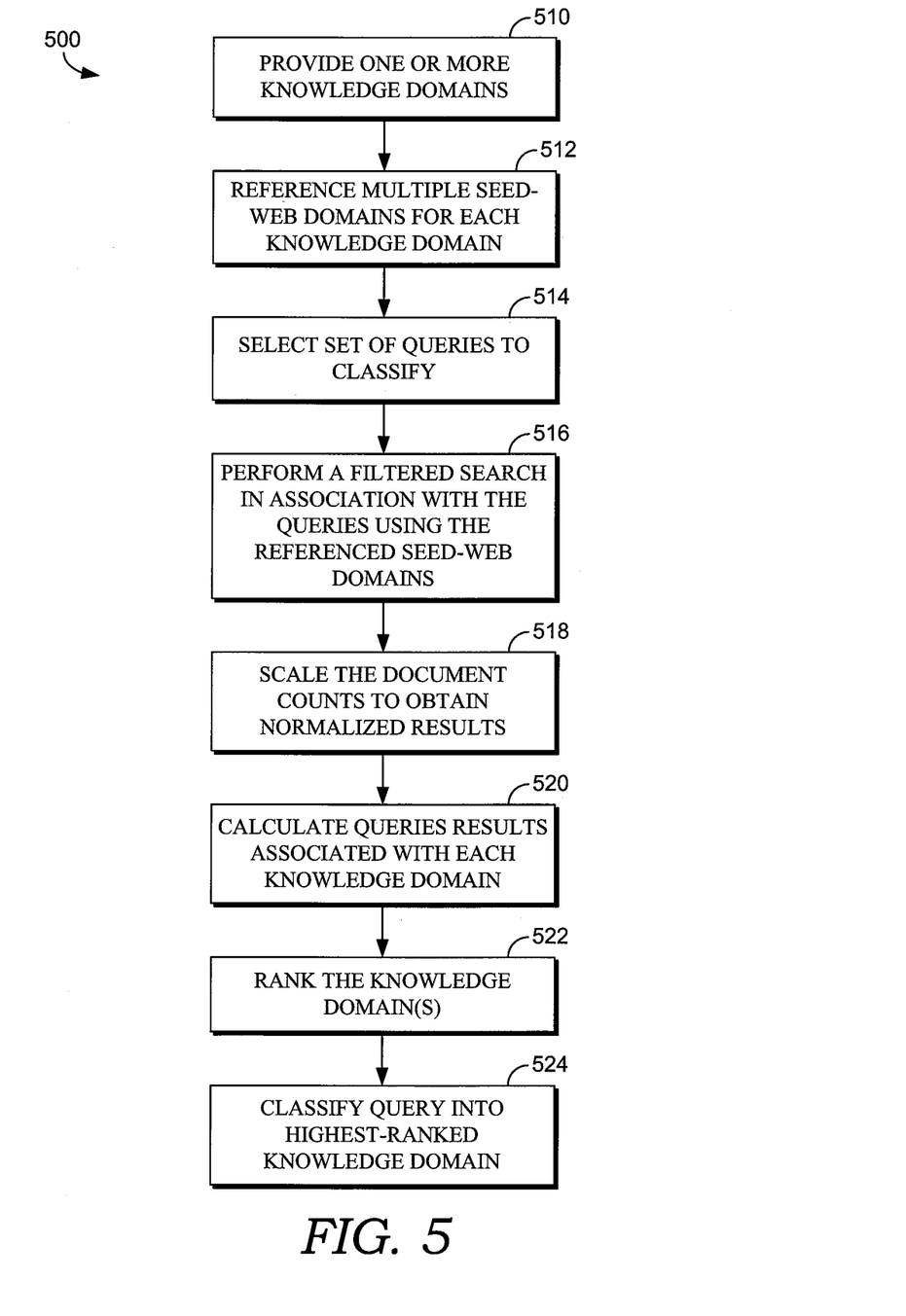
FIG. 5 is a flow diagram for a method of classifying a query used in accordance with embodiments of the invention.

FIG. 5 is a flow diagram for a method 500 of classifying a query in association with a knowledge domain. One or more knowledge domains are provided in step 510. Embodiments of the invention are not restricted to any set number of knowledge domains, nor are embodiments restricted to any degree of category or categories encompassed. Such knowledge domains are associated with a plurality of seed-web domains. For each knowledge domain, multiple seed-web domains are referenced in step 512. The number of referenced seed-web domains is not limited to a specific amount. The referenced seed-web domains may include the closest web sites related to the corresponding knowledge domain or service of interest. In embodiments, the number of seed-web domains corresponding with a knowledge domain provides a strong statistical significance and may not require extensive information from a user. The number of seed-web domains can be increased for better precision. A specific niche market may require fewer seed-web domains to provide a strong statistical significance.

A set of queries is selected in step 514. A filtered search is performed in association with the queries using the referenced seed-web domains, as indicated in step 516.

Figure 6:
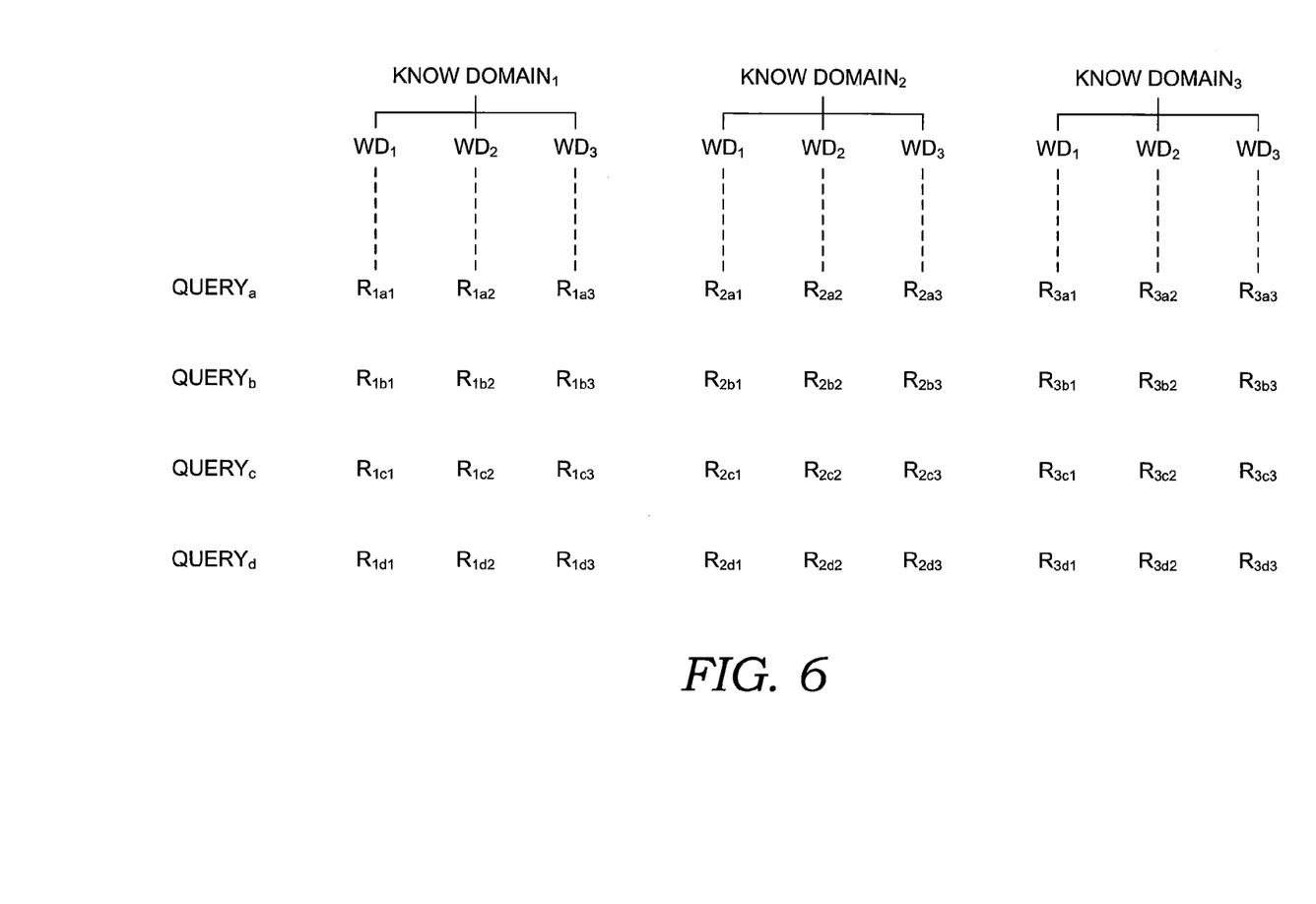
FIG. 6 is an illustration of filtered search results used in accordance with embodiments of the invention.

FIG. 6 illustrates an example of results of a filtered search being performed in association with a set of queries. FIG. 6 illustrates only three knowledge domains with only three seed-web domains for each knowledge domain for simplicity of illustration. For knowledge domain 1 (KNOW DOMAIN$_1$), there are three seed-web domains, WD$_1$, WD$_2$, and WD$_3$. FIG. 6 illustrates four queries, QUERY$_a$, QUERY$_b$, QUERY$_c$, and QUERY$_d$ that are searched against the three web domains of each knowledge domain. However, there could be any number of queries, including a very large number of queries that comprise the set of reference queries. Results are displayed for each of the four queries against each of the three web domains within knowledge domain 1. For QUERY$_a$, filtered search results of R$_{1a1}$, R$_{1a2}$, and R$_{1a3}$ are obtained for WD$_1$, WD$_2$, and WD$_3$, respectively for knowledge domain 1. For QUERY$_b$, filtered search results of R$_{1b1}$, R$_{1b2}$, and R$_{1b3}$ are obtained for WD$_1$, WD$_2$, and WD$_3$, respectively for knowledge domain 1. For QUERY$_c$, filtered search results of R$_{1c1}$ R$_{1c2}$, and R$_{1c3}$ are obtained for WD$_1$, WD$_2$, and WD$_3$, respectively for knowledge domain 1. For QUERY$_d$, filtered search results of R$_{1d1}$, R$_{1d2}$, and R$_{1d3}$ are obtained for WD$_1$, WD$_2$, and WD$_3$, respectively for knowledge domain 1. Filtered search results are similarly obtained for knowledge domain 2 (KNOW DOMAIN$_2$) and knowledge domain 3 (KNOW DOMAIN$_S$).

With reference back to FIG. 5, the query results previously obtained are scaled to obtain normalized results in step 518. For each knowledge domain, query results are calculated to obtain a total number or an average of search results or document counts corresponding with a particular knowledge domain, as indicated in step 520. The knowledge domains are ranked in step 522 based upon search results (e.g., total number or average) for each respective knowledge domain. The query is then classified into the highest-ranked knowledge domain in step 524.

With reference back to FIG. 2, in another embodiment, the query classification component 220 classifies queries using coverage for a particular query. In such an embodiment, a web-domain filtered search is conducted for a plurality of queries, for example, each of the queries in the set of queries referenced by the query referencing component 215. The total number of documents, pages, or search results is identified or counted for each web-domain filtered search.

A web search is implemented for a various number of filtered searches. In this regard, a web search may be performed a particular number of times, using a different seed-web domain as a filter for each web search. As an example, if the web-domain referencing component 210 references five seed-web domains, then each given query would be searched five times, using a different web domain filter for each of the five web searches.

A coverage for a given query is determined, for example, by dividing the total document count from each filtered search by the total number of documents for that particular web domain. For example, the total number of documents returned from a filtered search of imdb.com would be divided by the total number of documents that exist on the imdb.com web site. Such a coverage provides a confidence of how closely a particular query is related to a given knowledge domain or a seed-web domain associated therewith.

An average of these calculations (i.e., percentages) for each seed-web domain is computed for all of the respective filtered search results. In this regard, for each knowledge domain, an average coverage is calculated that averages the percent of coverage associated with each seed-web domain within a knowledge domain. In embodiments, results are normalized between zero and one in order to compare different sized web domains. Such normalization ensures that web sites with higher document counts are not weighted heavily in comparison to web sites with a lower total document count.

An additional confidence check can be made by utilizing a non-filtered search. If a certain number or percentage of non-filtered search results return links to one or more of the seed-web domains, then a higher level of confidence can be attributed to the resulting classifier. As an example for illustrative purposes only, a high level of confidence in the resulting classifier would result if the top 100-200 non-filtered search results contain one or more of the seed-web domains. A query can then be classified into the highest ranking knowledge domain from among the combined normalized results.

Figure 7:
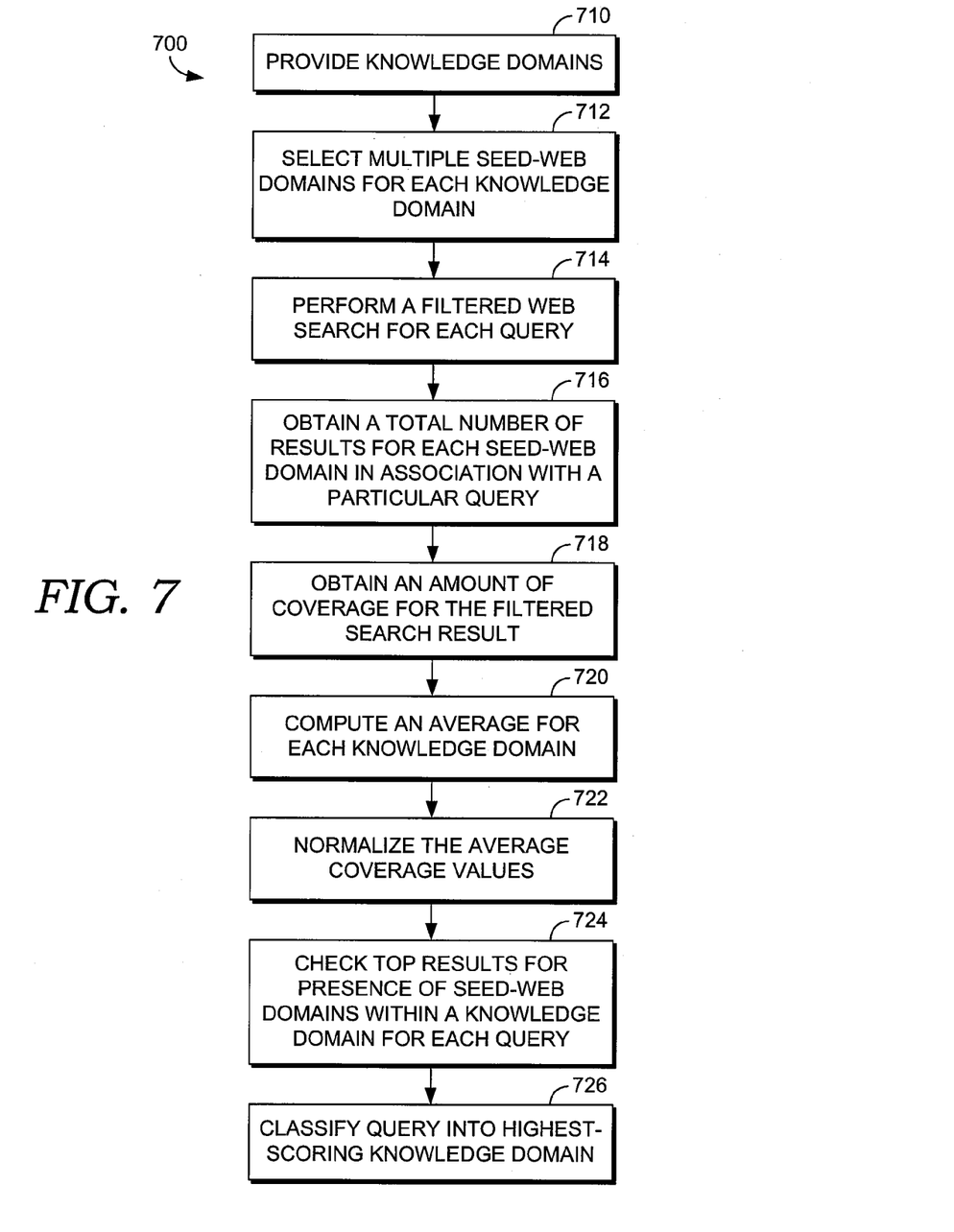
FIG. 7 is a flow diagram for a method of determining a query classification used in accordance with embodiments of the invention.

By way of example and with reference to FIG. 7, a flow diagram for a method 700 of determining a query classification is provided. Knowledge domains are provided in step 710. Multiple seed-web domains are selected for each knowledge domain in step 712. A filtered web search is performed for each query in step 714. A total number of search results is obtained for each seed-web domain in association with a particular query, as indicated in step 716. The amount of coverage for the filtered search results is obtained by dividing the number of pages returned by the total number of pages for the respective seed-web domain, as indicated at block 718. An average is computed in step 720 for the results obtained in step 718 for each knowledge domain using the amounts of coverage for the seed-web domains associated with the knowledge domain. The average percentage of coverage will be described in more detail hereinafter with reference to FIG. 8. The average coverage values are normalized to a value, for example, between zero and one in step 722. The top search results are checked for the presence of any seed-web domains within a knowledge domain for each query in step 724. The query is classified into the highest-scoring knowledge domain in step 726 from the previously obtained results.

In embodiments, the search engine server may also perform the task of classifying queries. The search engine server may assign the queries to a particular category that is descriptive of their content. A service of interest may be generated from a search engine service or an advertising service, as well as any other service interest body. A query classifier based on web relevance can be developed for a specific service of interest to determine if a query is related to their service of interest. A query classifier can also be developed for an entity with several areas of interest to determine which area or service should be called for a particular query.

Figure 8:
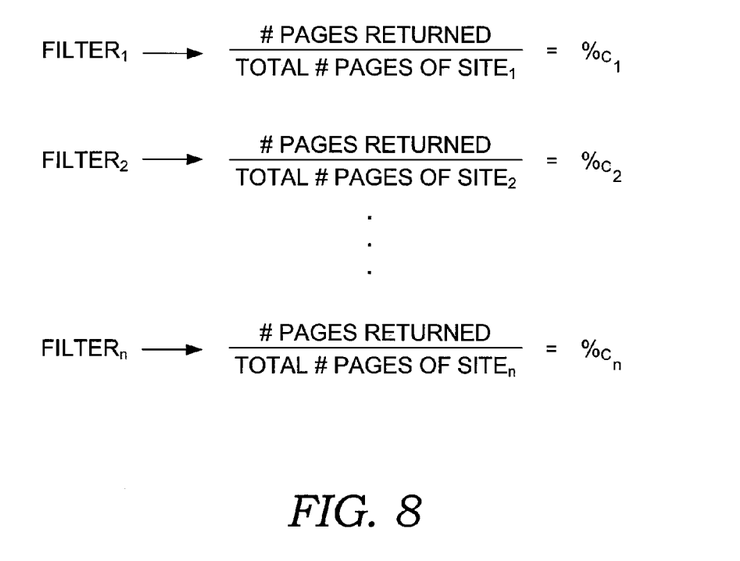
FIG. 8 is an illustration of coverage calculations used in accordance with embodiments of the invention.

FIG. 8 illustrates an exemplary calculation for average percentages of coverage for each reference seed web domain for a given set of reference queries. As an example, the given set of reference queries could be a set of random queries or a set of popular queries. A seed web site $filter_1$ is used to search a given query from the set of reference queries, wherein the total number of returned pages is only from seed web $site_1$. As an example, a seed web site filter for amazon.com would only return results from the amazon.com web site. A seed web site $filter_2$ and a seed web site $filter_n$ are used to search the given query from the set of reference queries, wherein the total number of returned pages is only from seed web $site_2$ and from seed web $site_n$, respectively. The number of pages that are present on each of the respective web domains is also obtained. Continuing with the previous example, the total number of pages returned from using the amazon.com filter is divided by the number of pages that are present on the amazon.com web site. This calculation provides the percentage of coverage for reference seed web $domain_1$, which is referenced as % $c_1$. The percentage of coverage for reference seed web $domain_2$ and reference seed web $domain_n$ are referenced as % $c_2$ and % $c_n$, respectively.

The previous calculations are implemented over n seed-web domains associated with a knowledge domain to obtain the percentage of coverage for a knowledge domain. The average for each of the coverage percentages is computed using the percent of coverage for each seed-web domain. Accordingly, the average percent of coverage for the knowledge domain is the total percents divided by the number of coverages. In this regard, the average percent of coverage is represented by (% $c_1$+% $c_2$+ . . . +% $c_n$)/n.

Figure 9:
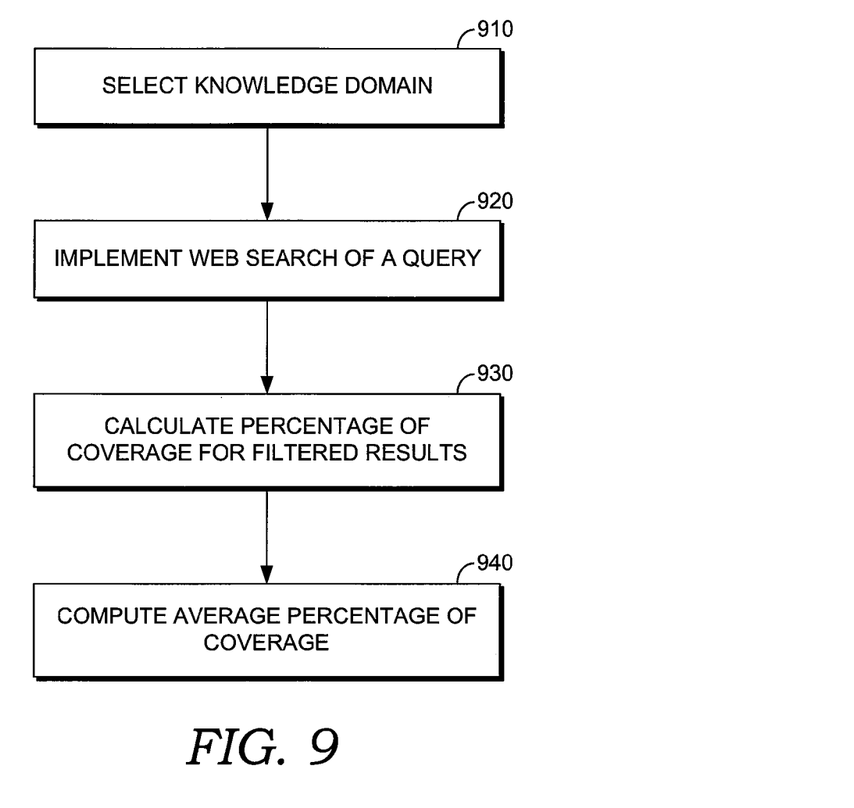
FIG. 9 is a flow diagram for a method of determining a query classification used in accordance with embodiments of the invention.

A computer-implemented method of determining a query classification is illustrated in a flow chart in FIG. 9. A knowledge domain, which is also referred to as a category or service of interest, is selected in step 910. The knowledge domain contains a set of seed-web domains which are classified to belong to the knowledge domain. The seed-web domains are deemed to be representative of the knowledge domain to which they are classified. There is no specific number of reference seed web domains. A web search for a given query from a set of queries is implemented for each of the seed-web domains in step 920. Seed web domain filters are utilized to obtain filtered results for each seed web domain for the given query. As an example, for a set of five seed-web domains, a first web search of the given query is implemented using a web filter for the first seed web domain, to obtain filtered results of the first seed web domain. A second web search of the given query is implemented using a web filter for the second seed-web domain to obtain filtered results of the second reference seed web domain. A third, fourth, and fifth web search of the given query are implemented using a web filter for the third, fourth, and fifth seed-web domains to obtain filtered results of the third, fourth, and fifth seed-web domains, respectively.

A percentage of coverage for each of the filtered results is calculated in step 930. This can be calculated by taking the total number of pages returned from a seed web domain filtered search of the given query, then dividing by the total number of pages that are present for that seed-web domain. An average for each of the coverage percentages is then calculated for the filtered search results in step 940.

In embodiments, the average coverage value signifies a level of relevance to the knowledge domain. An average coverage value should exceed a minimum normalized coverage value in order to be considered significant. In such an embodiment, if a normalized coverage value does not exceed a minimum established value, then classification into that particular knowledge domain may not be appropriate or a good match. Accordingly, returning unintended results to a user can be reduced by establishing a minimum coverage value.

In addition to the steps discussed above with reference to FIG. 9, a check of confidence in the query classification can be implemented. A general, non-filtered web search can be conducted on the given query, in addition to the filtered searching described above. If top results from the general web search query contain at least one of the seed-web domains for the given knowledge domain, then a certain level of confidence can be added to the query classification. As an example for illustrative purposes only, the top ten results of the general non-filtered search can be considered. A level of confidence, proportional to the standing within the top ten results can be applied to the query classification. In another example, if there is a small difference between the highest knowledge domain and a second highest knowledge domain, then the query may be considered ambiguous and can be classified in both knowledge domains equally.

Multiple knowledge domains can be utilized to obtain an optimum knowledge domain in which to classify a given query from a set of queries. The given query would be classified into the knowledge domain which contained the highest coverage value (e.g., normalized average coverage value), as calculated above. As an example for illustrative purposes only, a particular service such as an advertising service or a search engine service may have several services of interest. Therefore, a given query can possibly be classified into one of many knowledge domains or services of interest.

Figure 10:
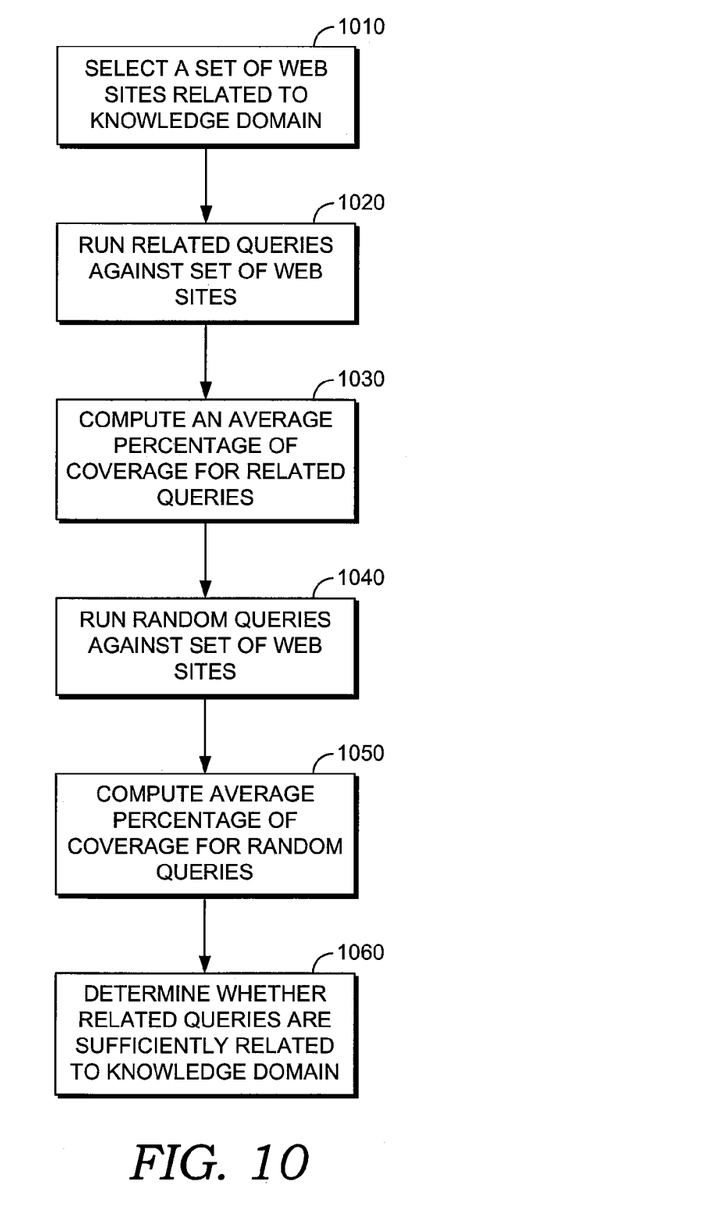
FIG. 10 is a flow diagram for a method of classifying a query used in accordance with embodiments of the invention.

FIG. 10 is a flow diagram for a computer-implemented method or an algorithm on a computer-readable storage medium for classifying a query into a knowledge domain. A set of reference web sites are selected which are closely related to a knowledge domain of interest in step 1010. A plurality of reference queries which are related to the knowledge domain of interest are run against the set of reference web sites in step 1020. An average percentage of coverage for each of the reference web sites for the plurality of related reference queries is computed in step 1030. A random set of queries is also run against the set of reference web sites in step 1040. An average percentage of coverage for each of the reference web sites for the random queries is computed in step 1050. It is then determined whether the plurality of reference queries is sufficiently related to the knowledge domain of interest in step 1060. An embodiment of the invention makes this determination when the average percentage of coverage for the plurality of related reference queries sufficiently outweighs the average percentage of coverage for the set of random queries. If the average percentages of coverage for the related reference queries do not outweigh the average percentages of coverage for the random queries, then the query may not be properly classified in the given knowledge domain of interest. A minimum threshold significance value can be established to make this determination. An embodiment of the invention also provides returning results containing one or more web site links and a plurality of related links for the set of web sites.

In an alternative embodiment, the actual non-filtered results from a web index of a query can be checked for close results between multiple web domains. If the results contain any of the closely held web domains, then the query is classified into the top-ranked knowledge domain for that web domain. For example, actual non-filtered results for the query "dark knight" may contain a first-ranked web domain directed to "movies" and also contain a second-ranked web domain directed to "video games." The query would be classified into the top-ranked "movies" knowledge domain.

In another alternative embodiment, entities of a random set can be extracted to verify the appropriate classification given to each entity. Entity dictionaries associated with each classified domain can be loaded into a matcher. The classified queries are run through the matcher and the appropriate entities for the query's domain are returned.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of determining a query classification using a computing system having processor, memory, and data storage subsystems, the computer-implemented method comprising:

selecting a knowledge domain comprising a plurality of seed-web domains which are classified to belong to the knowledge domain;

for each seed-web domain, performing a filtered web search of a given query utilizing a filter associated with a particular seed-web domain to identify a total number of filtered documents associated with the seed-web domain that are relevant to the given query thereby resulting in each seed-web domain within the knowledge domain having a corresponding total number of filtered documents;

for each seed-web domain, referencing a total number of documents corresponding with the seed-web domain thereby resulting in each seed-web domain within the knowledge domain having a corresponding total number of documents;

calculating, via the processor, a coverage for each seed-web domain using the total number of filtered documents associated with the seed-web domain and the total number of documents corresponding with the seed-web domain thereby resulting in each seed-web domain within the knowledge domain having a corresponding coverage, wherein the coverage for each seed-web domain is calculated by dividing the total number of filtered documents pages for the corresponding seed-web domain by the total number of documents for the seed-web domain; and computing an amount of coverage for the knowledge domain using the calculated coverage for each seed-web domain.

2. The computer-implemented method of claim 1, further comprising: selecting a plurality of knowledge domains.

3. The computer-implemented method of claim 2, further comprising: classifying the given query in the knowledge domain which comprises the highest average percentage of coverage.

4. The computer-implemented method of claim 1, wherein the average percentage of coverage signifies a level of relevance to the knowledge domain.

5. The computer-implemented method of claim 1, wherein a significant average percentage of coverage exceeds a minimum average percentage of coverage.

6. The computer-implemented method of claim 5, wherein the significant average percentage of coverage reduces returning unintended results to a user.

7. The computer-implemented method of claim 1, further comprising:

conducting a general web search on the given query; and determining if top results for the general web search query contain one or more of the seed-web domains for the knowledge domain.

8. One or more computer-readable storage devices containing computer-readable instructions for an algorithm embodied thereon that, when executed by a computing device, perform steps for determining a query classification, the algorithm comprising:

selecting a knowledge domain comprising a plurality of seed-web domains which are classified to belong to the knowledge domain;

for each seed-web domain, performing a filtered web search of a given query utilizing a filter associated with a particular seed-web domain to identify a total number of filtered documents associated with the seed-web domain that are relevant to the given query thereby resulting in each seed-web domain within the knowledge domain having a corresponding total number of filtered documents;

for each seed-web domain, referencing a total number of documents corresponding with the seed-web domain thereby resulting in each seed-web domain within the knowledge domain having a corresponding total number of documents;

calculating, via the processor, a coverage for each seed-web domain using the total number of filtered documents associated with the seed-web domain and the total number of documents corresponding with the seed-web domain thereby resulting in each seed-web domain within the knowledge domain having a corresponding coverage, wherein the coverage for each seed-web domain is calculated by dividing the total number of filtered documents pages for the corresponding seed-web domain by the total number of documents for the seed-web domain; and computing an amount of coverage for the knowledge domain using the calculated coverage for each seed-web domain.

9. The device of claim 8, further comprising: selecting a plurality of knowledge domains.

10. The device of claim 8, further comprising: classifying the given query in the knowledge domain which comprises the highest average percentage of coverage.

11. The device of claim 8, wherein the average percentage of coverage signifies a level of relevance to the knowledge domain.

12. The device of claim 8, wherein a significant average percentage of coverage exceeds a minimum average percentage of coverage.

13. The device of claim 12, wherein the significant average percentage of coverage reduces returning unintended results to a user.

14. The device of claim 8, further comprising:
conducting a general web search on the given query; and
Determining if top results for the general web search query contain one or more of the seed-web domains for the knowledge domain.

* * * * *